United States Patent [19]

Okada et al.

[11] Patent Number: 5,709,249

[45] Date of Patent: Jan. 20, 1998

[54] LOCKING STRUCTURE

[75] Inventors: Eiji Okada; Tomoyasu Murakami; Mitsunari Tashiro, all of Hiroshima, Japan

[73] Assignee: Yazaki Corporation, Tokyo, Japan

[21] Appl. No.: 493,567

[22] Filed: Jun. 22, 1995

[30] Foreign Application Priority Data

Jun. 27, 1994 [JP] Japan ................................. 6-144752

[51] Int. Cl.⁶ ................................................. F16B 5/00
[52] U.S. Cl. ........................ 138/162; 174/68.3; 174/101
[58] Field of Search .................................. 174/101, 68.3, 174/136, 92; 138/156, 157, 162, 166

[56] References Cited

U.S. PATENT DOCUMENTS

| 3,484,541 | 12/1969 | Campbell | 174/92 X |
| 3,711,633 | 1/1973 | Ghirardi et al. | 174/135 |
| 4,797,512 | 1/1989 | Kumagai et al. | 174/135 |
| 4,891,471 | 1/1990 | Ono et al. | 174/68.3 |
| 4,951,716 | 8/1990 | Tsunoda et al. | 174/68.3 X |
| 5,095,296 | 3/1992 | Parker | 174/92 X |

FOREIGN PATENT DOCUMENTS

| 64-12420 | 1/1989 | Japan . | |
| 1-166415 | 11/1989 | Japan . | |
| 6-86426 | 3/1994 | Japan | 174/68.3 |

Primary Examiner—Hyung S. Sough
Attorney, Agent, or Firm—Oblon, Spivak, McClelland, Maier & Neustadt, P.C.

[57] ABSTRACT

A locking structure including a case having a bottom plate and a pair of side walls extending upward from both side edges of the bottom plate. The locking structure further includes a cover for closing the opening defined between the top ends of the pair of side walls, stopping projections provided on each side wall of the case, and engaging frames each of which is formed at each side end of the cover and has a window to be engaged with each stopping projection. A portion near the opening of each engaging frame and a portion near the opening of each stopping projection facing that engaging frame defining a space therebetween.

3 Claims, 6 Drawing Sheets

LOCKING STRUCTURE

BACKGROUND OF THE INVENTION

1. Technical Field

This invention relates to a locking structure including a case and a cover.

2. Description of the Related Art

Japanese Patent Application for Disclosure HEI-1-166415 teaches one example of conventional locking structures. This structure includes a cover and an elongated protector for protecting a wire harness. The protector includes a bottom plate and a pair of side walls extending upward from both edges of the bottom plate. These bottom plate and side walls form a substantially U-shaped portion for containing the wire harness. The cover is a plate to close the opening defined as the top face of the protector between the top ends of these side walls.

Additionally, stopping projections are provided at each upper portion of the outer face of these side walls, each of which has a substantially rectangular shape when seen vertically to the side walls. Further, flexible engaging frames are provided at each side edge of the cover, each of which has a substantially rectangular shape when seen vertically to the side wall. A slope is formed at the top portion of each stopping projection for smooth engagement with the corresponding engaging frame on the attachment of the cover. In this case, the stopping projections and engaging frames are formed integrally with the protector and cover using a resin, respectively.

In such a locking structure, when some torsional moment is applied about the longitudinal axis of the protector equipped with the cover, both the side walls tend to be transformed in the opposite directions along that axis. The resultant counterforce acts on the cover in the opposite direction to the transformation of each side wall. As a result, each stopping projection tends to slip out of the corresponding engaging frame so that the cover is removed from the protector.

SUMMARY OF THE INVENTION

To solve the problem of the prior art, the present invention provides a locking structure which can retain the engagement between the engaging frames and the stopping projections to prevent undesired removal of the cover on the aforementioned torsional transformation.

To achieve the above object, the locking structure according to the present invention includes a case having a bottom plate and a pair of side walls extending upward from both side edges of the bottom plate. The locking structure further includes a cover for closing the opening defined between the top ends of the pair of side walls, stopping projections provided on each side wall of the case, and engaging frames each of which is formed at each side end of the cover and has a window to be engaged with each stopping projection. And a portion near said opening of each engaging frame and a portion near said opening of each stopping projection facing that engaging frame define a space therebetween.

According to this construction, the space provided between each engaging frame and stopping projection can absorb the bending transformation of the cover when the case closed by that cover is transformed due to some torsional moment. Therefore, the engagement between the cover and case via the engaging frame and stopping projection can be retained even on that torsional transformation of the entire assembly.

Alternatively, the space may be formed to spread as it proceeds in the direction from said bottom plate to said opening.

Further, the engaging frame may include a pair of frame side portions extending in the direction from the cover to the bottom plate, and a bottom portion for coupling the distal ends of these frame side portions.

Preferably, the stopping projection has side faces which are sloped to form said spreading spaces with said frame side portions when the stopping projection fits In the engaging frame.

According to this construction, in addition to the general advantage described above on retaining the engagement between the cover and case, the spreading space formed between the engaging frame and stopping projection or the sloped side face of the stopping projection can absorb more efficiently said bending transformation of the cover.

Alternatively, a pair of restraint portions may be provided on both sides of the engaging frame to further prevent that frame from slipping out of the stopping projection.

Preferably, the restraint portion is provided parallel to said frame side portion.

According to this construction, in addition to the above advantages, the movement of each frame side portion can be further restricted by the restraint portion. Therefore, the engagement between the engaging frame and stopping projection can be retained more stably.

DESCRIPTION OF THE PREFERRED EMBODIMENT

Hereinafter, the first embodiment of this invention will be described with reference to the drawings.

Figure 1:
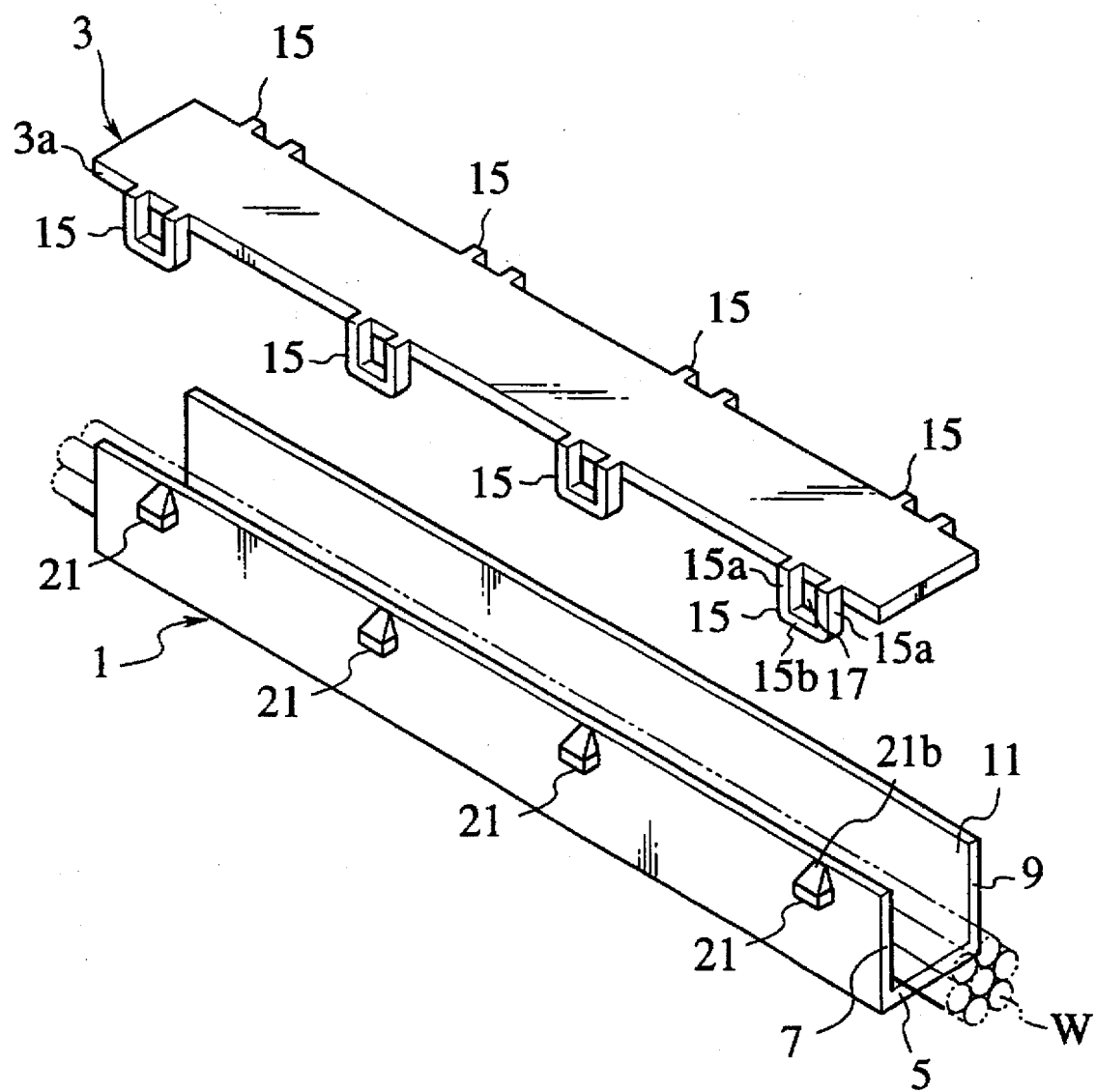
FIG. 1 is a perspective view of a protector as the first embodiment including the locking structure of this invention.

FIG. 1 shows a case and a cover for constructing the first embodiment of the present invention. In the same drawing, the case is designated by elongated protector 1 provided with cover 3 for containing and protecting wire harness W. The protector 1 includes bottom plate 5 and a pair of side walls 7, 9 vertically extending from the bottom plate 5. Namely, the bottom plate 5 and side walls 7, 9 constitute a substantially U-shaped groove for containing wire harness W. The cover 3 is a plate for closing the top opening 11 defined between the side walls 7,9.

Figure 2:
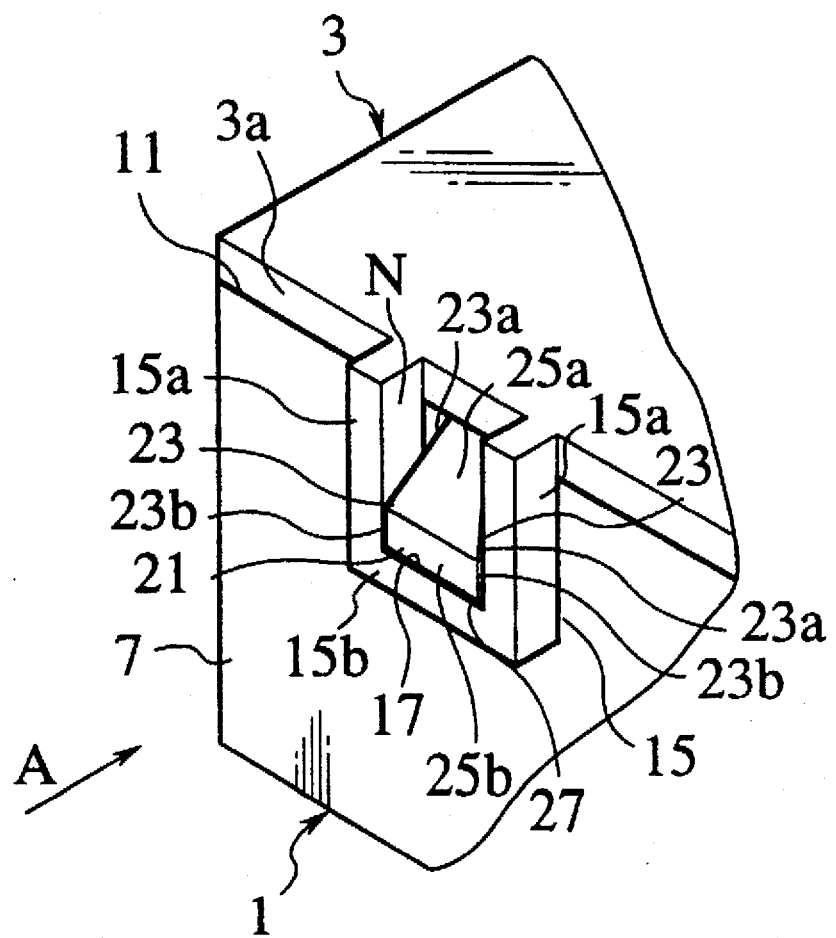
FIG. 2 is a perspective view for expanding the important portion of the first embodiment shown in FIG. 1.

Trapezoidal stopping projections 21 are provided at the upper portion of the outer faces of side walls 7, 9, respectively. Additionally, flexible engaging frames 15 are provided at both side edges 3a of the cover 3. As shown in FIG. 2, each frame 15 is provided with window 17 having a substantially rectangular shape when seen vertically to the side wall 7.

Namely, to close the opening 11, the cover 3 is attached to the protector 1 by fitting each stopping projection 21 in the corresponding window 17 of the engaging frame 15.

Figure 4:
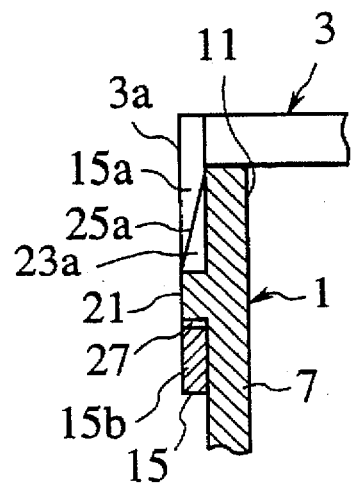
FIG.4 is a cross-section taken along the line B—B of FIG. 3.

As shown in FIG. 2, each engaging frame 15 includes a pair of frame side portions 15a and a frame bottom portion 15b for coupling these side portions 15b. When the cover 3 is engaged with the protector 1, the bottom face 27 of stopping projection 21 extends parallel to the frame bottom portion 15b. Namely, as is seen best from FIG. 4, the engagement between the bottom face 27 and frame bottom portion 15b prevents the cover 3 from slipping out of the protector 1.

Figure 3:
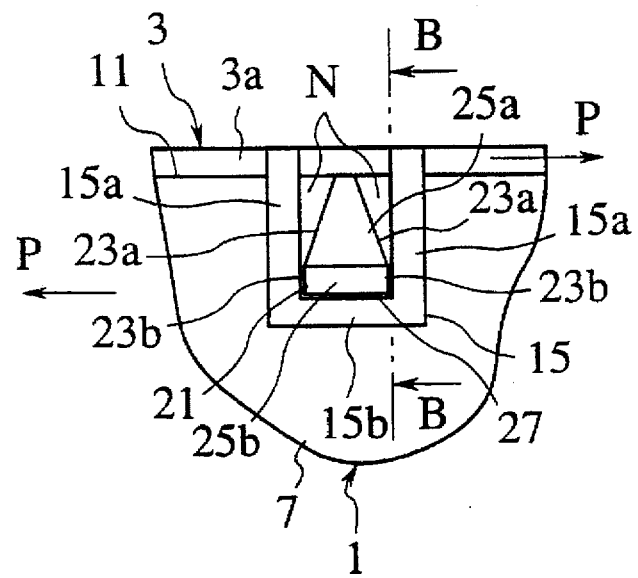
FIG. 3 is a side view seen along the arrow A in FIG. 2.

As shown In FIG. 3, the front face (when seen vertically to the side wall 7 or 9) of stopping projection 21 includes upper oblique front face 25a and lower flat front face 25b. Thus, on the attachment of the cover 3, the frame bottom portion 15b of engaging frame 15 can be smoothly moved and flexibly deflected on the oblique front face 25a until it is engaged with the bottom face 27 of stopping projection 21. In this case, the engaging frame 15 and stopping projection 21 are integrally formed with the cover 3 and protector 1 using a resin, respectively.

Further, each side face 23 of stopping projection 21 includes upper oblique side face 23a and lower flat side face 23b so that upwardly spreading space N is provided between each oblique side face 23a and the corresponding frame side portion 15a.

In this construction, the contact between the frame bottom portion 15b of each engaging frame 15 and the bottom face 27 of each stopping projection 21 can keep that projection 21 being fitted in that frame 15.

Figure 5:
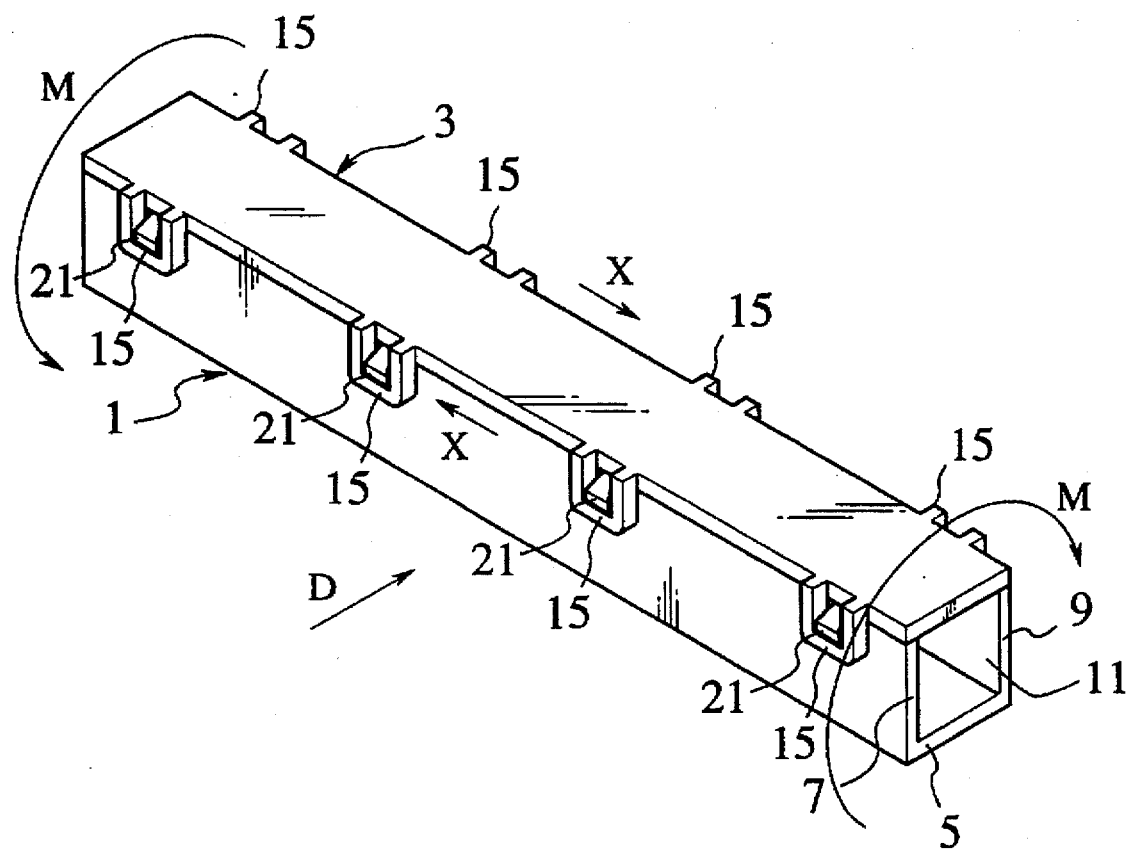
FIG. 5 is a perspective view in which some torsional moment is applied to the protector shown in FIG. 1.
Figure 6:
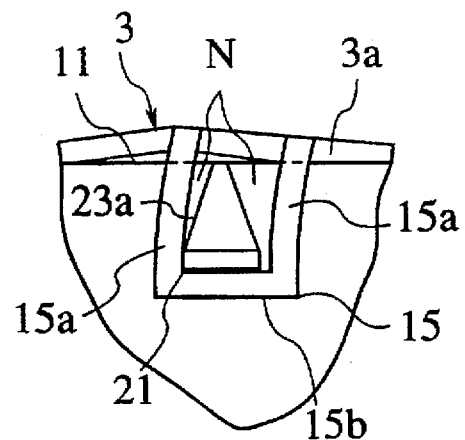
FIG. 6 is a side view showing the locking structure of FIG. 3 to which some torsional moment is applied.

If torsional moment is exerted on the protector 1 with cover 3 as shown in FIG. 5, the torsional deformation of the protector 1 occur and a pair of upper portions of the side walls move away from each other in the longitudinal direction of the protector 1 (the direction indicated by the arrow X in FIG. 5). Therefore, as shown in FIG. 3, the force P is exerted on the side wall and the cover, and the engaging frame 15 is deformed as shown in FIG. 6. But the space N provided between each engaging frame 15 and stopping projection 21 can absorb bending transformation of the engaging frame 1S as shown in FIG. 6. Therefore, the engagement between the cover 3 and protector 1 via each engaging frame 15 and stopping projection 21 can be retained even on that torsional transformation of the entire assembly.

Next the second embodiment will be described.

Figure 7:
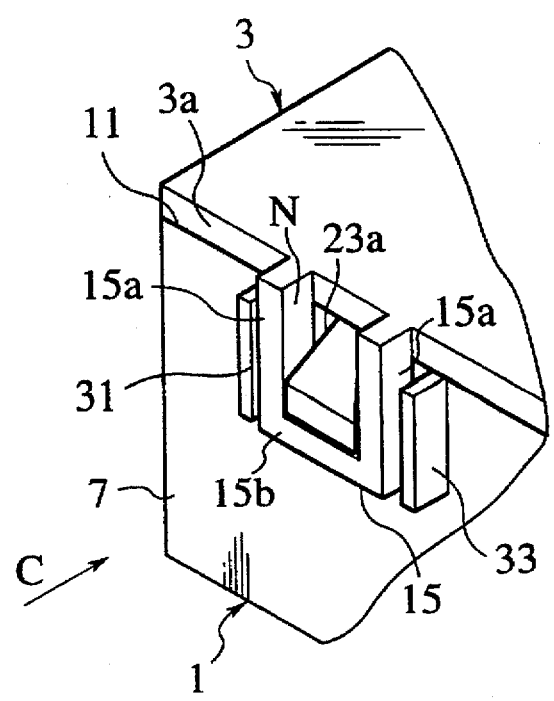
FIG. 7 is a perspective view for showing an expanded important port/on of the second embodiment.
Figure 8:
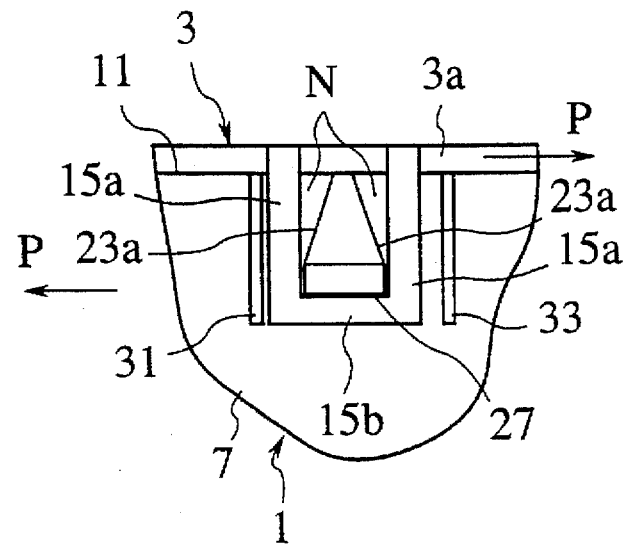
FIG. 8 is a side view seen along the arrow C in FIG. 7.
Figure 9:
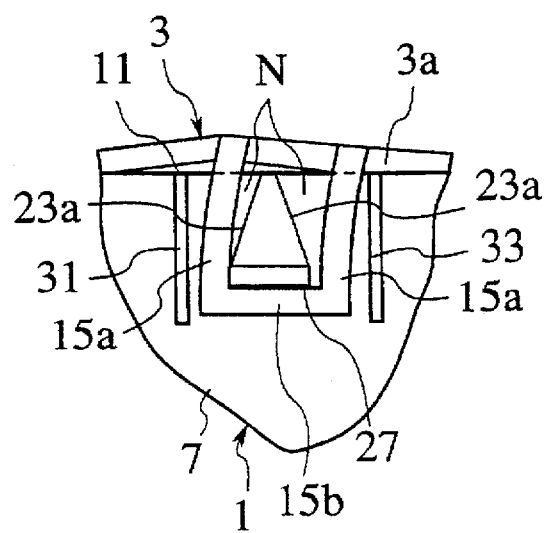
FIG. 9 s a side view showing the locking structure of FIG. 8 to which some torsional moment is applied.

FIG. 7 is a perspective view for showing an expanded important portion of the second embodiment, FIG. 8 is a side view seen along the arrow C in FIG. 7, and FIG. 9 shows the locking structure of FIG. 8 to which some torsional moment is applied. In these drawings, like parts in the first embodiment are designated by like reference numerals, respectively.

As shown in FIGS. 7 to 9, restraint portions 31, 33 are formed on the outer face of side walls 7, 9, respectively. Each pair of the restraint portions 31, 33 are located to be near and on both outsides of each engaging frame 15, respectively. Thus, the movement of each locked frame side portion 15a in the opposite direction to the stopping projection is restricted by these restraint portions 31, 33.

Accordingly, in addition to the effect of the first embodiment, the restraint of outward bending of each frame side portion 15a by the restraint portions 31, 33 can further assure stable engagement between the cover 3 and protector 1 via the engaging frame 15 and stopping projection 21.

As stated above, the locking structure according to the present invention includes a case having a bottom plate and a pair of side walls extending upward from both side edges of the bottom plate. The locking structure further includes a cover for closing the opening defined between the top ends of the pair of side walls, stopping projections provided on each side wall of the case, and engaging frames each of which is formed at each side edge of the cover and has a window to be engaged with each stopping projection. And a portion near said opening of each engaging frame and a portion near said opening of each stopping projection facing that engaging frame defining a space therebetween.

According to that locking structure, the space provided between each engaging frame and stopping projection can absorb the bending transformation of the cover when the case closed by that cover is transformed due to some torsional moment. Therefore, the engagement between the cover and case via the engaging frame and stopping projection can be retained even on that torsional transformation of the entire assembly.

What is claimed is:

1. A locking mechanism comprising:
   a bottom plate;
   a pair of side walls extending upward from both side edges of the bottom plate;
   a cover for closing an opening defined between top ends of the pair of side walls;
   a plurality of stopping projections provided in a spaced manner on each of said side walls; and
   a plurality of engaging frames each of which is formed in a spaced manner at each side end of the cover and has a window to be engaged with each stopping projection;
   each of said engaging frames comprising:
      a pair of frame side portions which extend in a direction from said cover to said bottom plate; and
      a frame bottom portion for coupling distal ends of said frame side portions;
   each of said stopping projections comprising:
      a pair of oblique side faces which respectively face an inside face of said pair of frame side portions when said stopping projection is fitted in the window of the engaging frame, wherein a space is defined between the inside faces of said frame side portions and said oblique side faces when said stopping projection is fitted in the window of the engaging frame, said space increasing in size in a direction from said frame bottom portion to said cover and permitting an absorption of a bending deformation of the cover upon an application of a torsional moment to the locking mechanism.

2. A locking mechanism according to claim 1, further comprising:
   a pair of restraint portions provided on each side of said side walls and located to be outside of each engaging frame for restricting a movement of each frame side portion in an opposite direction to said stopping projections.

3. A locking mechanism according to claim 2, wherein:
   said restraint portion is formed parallel to said frame side portion.

* * * * *